United States Patent [19]

Weichenrieder

[11] Patent Number: 4,577,980

[45] Date of Patent: Mar. 25, 1986

[54] ANTI-FRICTION BEARING UNIT OF A SYNTHETIC RESIN PROCESSING MACHINE

[75] Inventor: Erich Weichenrieder, Egling-Neukolbing, Fed. Rep. of Germany

[73] Assignee: Recycloplast AG, Egling-Neukolbing, Fed. Rep. of Germany

[21] Appl. No.: 634,084

[22] Filed: Jul. 24, 1984

[30] Foreign Application Priority Data

Jul. 27, 1983 [DE] Fed. Rep. of Germany ....... 3327132

[51] Int. Cl.[4] ........................ F16C 19/26; F16C 33/46; F16C 33/66; F16C 33/80
[52] U.S. Cl. ................................ 384/488; 384/462; 384/564; 384/565; 384/574
[58] Field of Search ............... 384/477, 488, 548, 564, 384/565, 567, 572, 574, 462, 470, 473; 308/217, 216, 215

[56] References Cited

U.S. PATENT DOCUMENTS

| | | | |
|---|---|---|---|
| 1,196,288 | 8/1916 | Reeves et al. | 384/567 |
| 2,011,192 | 8/1935 | Comstock | 384/488 |
| 2,062,041 | 11/1936 | Robinson | 384/565 X |
| 3,006,703 | 10/1961 | Bensch | 384/564 |

Primary Examiner—Stuart S. Levy
Assistant Examiner—Thomas R. Hannon
Attorney, Agent, or Firm—Harness, Dickey & Pierce

[57] ABSTRACT

An anti-friction bearing unit for a machine processing synthetic resin, and more specially one for the processing of scrap resin material at high pressures and temperatures, has rolling bodies placed between inner and outer running faces. The space between the running faces at an end of the bearing is, at operating temperatures, shut off apart from a small gap.

9 Claims, 4 Drawing Figures

ANTI-FRICTION BEARING UNIT OF A SYNTHETIC RESIN PROCESSING MACHINE

BACKGROUND OF THE INVENTION

The present invention relates to an anti-friction bearing unit for machines processing synthetic resins, having an outer and an inner running or race surface and rolling bodies placed between the race surfaces and spaced from each other by a ring-like cage.

With certain machines for processing resins there are very stringent demands with respect to bearings, this being more specially true of, for example, machines for processing waste resin under very high pressures and temperatures to produce regenerated resin. An account of such a machine is given in the German Pat. No. 2,700,846, in which comminuted resin or plastic scrap is plastified by squeezing between the rollers or a press, which produce the high pressure needed not only for plastifying but also for expelling the plastified regenerate from the machine. Because of the high radial pressures and the relatively high temperatures, it is not possible for plan bearings to be used for the squeezing rolls. Furthermore however conventional anti-friction bearings are not suitable either. Because of the high temperatures normal lubrication fails and there is also a strong chance when processing scrap resin of foreign bodies, as for example nails, being present in the resin and being swept along with it into the bearings. Lastly, the cages of conventional anti-friction bearings would not be able to stand up to the high pressures involved.

SHORT OVERVIEW OF THE INVENTION

One purpose of the invention is that of creating an anti-friction bearing unit, that is more specially suitable for duty in machines for processing scrap synthetic resin at relatively high pressures and temperatures and with the possibility of foreign bodies being present in the resin. The bearing unit is to vouch for a full uptake of high radial forces, for efficient lubrication even at high temperatures and for freedom from damage by foreign bodies.

In order to effect this and other purposes the space between the bearing running faces on the inner side of the anti-friction bearing is shut off by a cover at the operating temperature except for a narrow gap.

This ensures that foreign bodies are kept out by the cover and because of the throttling effect of the gap the high pressure of the resin is reduced, the pressure however nevertheless being quite sufficient to force plastified resin into the space between the inner and outer running faces as is needed for lubrication.

In keeping with a useful further development of the invention the rolling bodies of the anti-friction bearing are hollow so that they deform elastically to a certain degree with the outcome that more rolling bodies are able to exert a load bearing function at a time than would be the case if they were solid.

As part of a still further development of the invention, the bearing is fitted with the greatest possible number of rolling bodies, the bodies then being divided up into groups of at least two bodies which are separated by the cage, or the cage is made up of circumferentially spaced bearing pins for roller-like rolling bodies and at the operating temperature the distance between the bearing pins is only slightly larger than the diameter of such rolling bodies.

Further useful and expedient forms of the invention will be seen from the account now to be given of working examples thereof and from the claims.

There now follows an account of working examples of the invention using the figures.

LIST OF THE SEVERAL VIEWS OF THE DRAWINGS

DETAILED ACCOUNT OF THE WORKING EXAMPLES OF THE INVENTION

Figure 1:
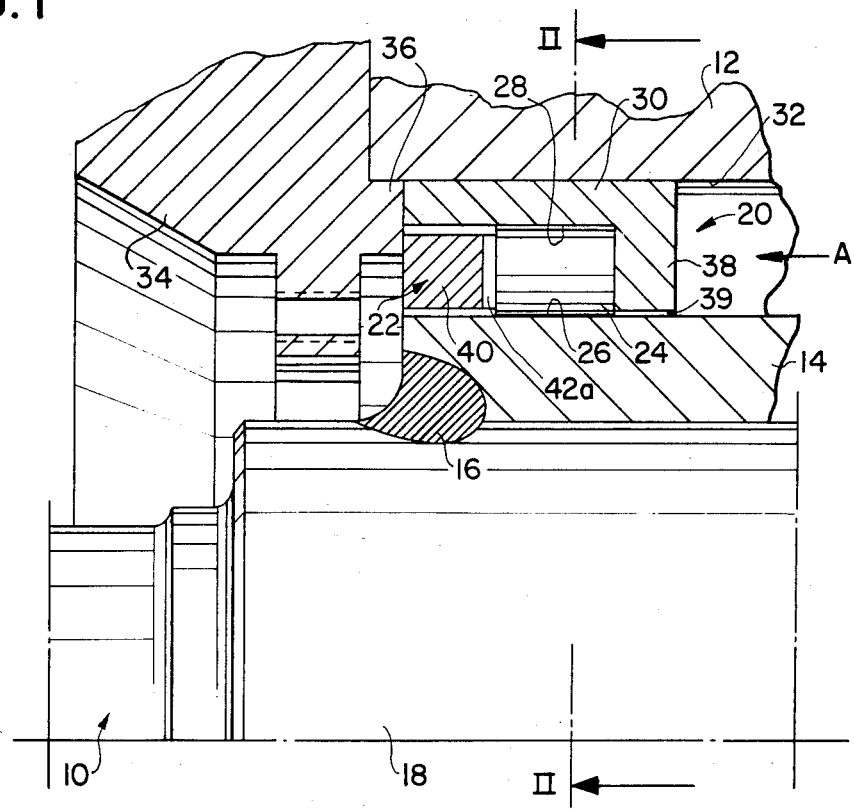
FIG. 1 is an axial section through a resin processing machine including one bearing unit.

To make possible a fuller understanding of the invention, the bearing unit will be seen in FIG. 1 in the fitted or mounted condition along with the directly adjacent parts of the machine. The bearing unit is used for turningly supporting a squeeze roll plastifying resin under a high pressure, or rather, for supporting the roll shaft 10 in a housing 12. The shaft 10 is in the form of a body of revolution 14, that is joined by a weldment 16 with a trunnion 18, said trunnion being used for example for connection with a drive. Between the housing 12 and the body of revolution 14 there is an anti-friction bearing generally referenced 20, that has cylindrical rollers 24 spaced out in the circumferential direction by a cage 22. The rollers 24 run on an inner running face 26 and an outer running face 28, the inner running face 26 being on the body of revolution 14 and the outer running face 28 being on a race ring 30 in a hole 32 in the housing 12. The hole 32 is shut off by an end plate 34, that has a ring-like shoulder 36 resting against the bearing race ring 30 and at the same time keeps the cage 22 in place. The further components next to the end plate 34, more specially the means for sealing the shaft trunnion 18, are not illustrated.

For lubrication of the bearings, use is made of plastified resin, standing under a high pressure, that makes its way into the bearing from the space inside the housing 12 in the direction of the arrow A. To keep any foreign bodies that happen to be present in the resin from finding their way into the bearing and to decrease the pressure acting thereon, the race ring 30 has its side nearest the inside of the housing fashioned with a radially inwardly running cover flange 38, which when the system is heated up to the operating temperature will have moved closer to the inner race ring so that there is only a narrow gap 39 therebetween and although the resin plastified at the high temperature is able to make its way through the gap 39 for lubrication of the bearing, any foreign bodies that may be contained in the resin are held back and are not able to get into the path of the moving rolling bodies.

The cage 22 has a solid ring 40, that is placed on the side of the bearing 20 furthest from the cover flange 38 and is so strong that the cage 22 is able to resist the high pressures likely to be produced. This cage 22 has axially projecting fingers 42a running out from one side of the ring 40 that fit between the rollers 24 and are adapted to the shape thereof. The fingers space out the rollers 24 circumferentially from each other. In this respect in the right hand half of FIG. 2 it will be seen that there is a cage 22a that spaces out the rollers 24.

The very high radial forces necessitate a maximum load bearing capacity of the bearing 20. One measure for increasing the load bearing capacity is by making the rollers hollow, as will be seen in the case of the rolling body 24a in FIG. 2 so that the rolling body may deform elastically and for this reason the bearing will be able to take up greater radial forces because such forces will then distribute themselves over a large number of rolling bodies 24.

Figure 2:
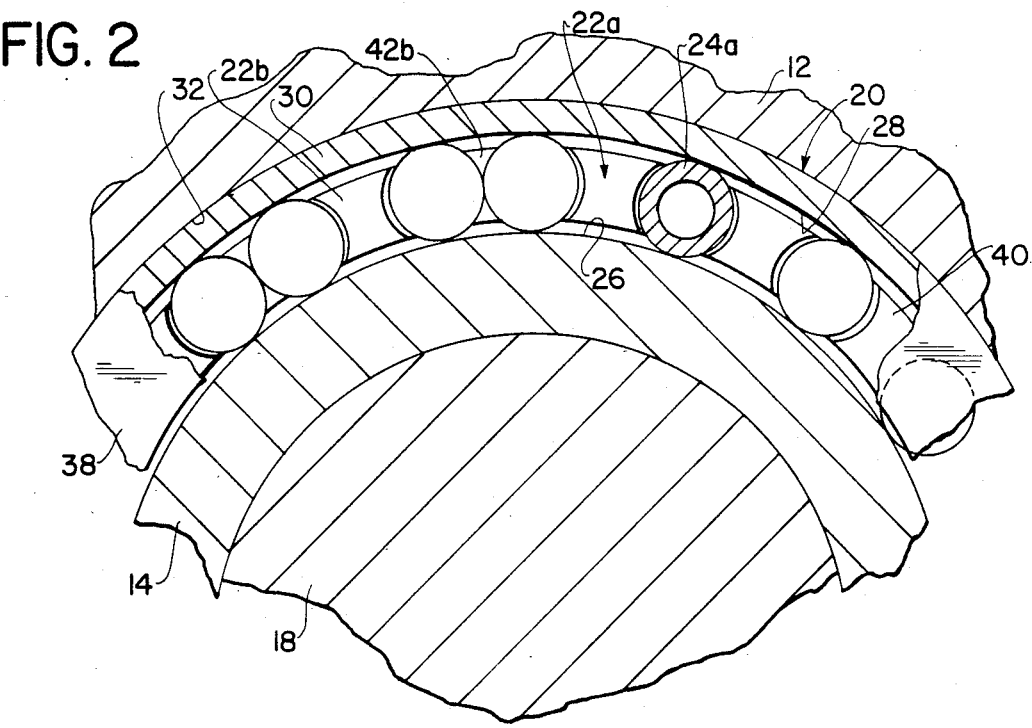
FIG. 2 is a section taken on the line II—II of FIG. 1, with a view of part of the bearing looking in the direction of the arrow A as marked in FIG. 1, the left and the right hand halves of the figure showing different possible forms of the rolling body arrangement.

A further measure for improving the load bearing capacity of the unit is by increasing the number of rolling bodies or cylindrical rollers 24 by, for example, having them in groups of at least two that are kept spaced by the fingers 42b of the cage 22b to be seen in the left hand half of FIG. 2; in other words it is only the groups that are spaced by the fingers and not the separate rollers 24.

Figure 3:
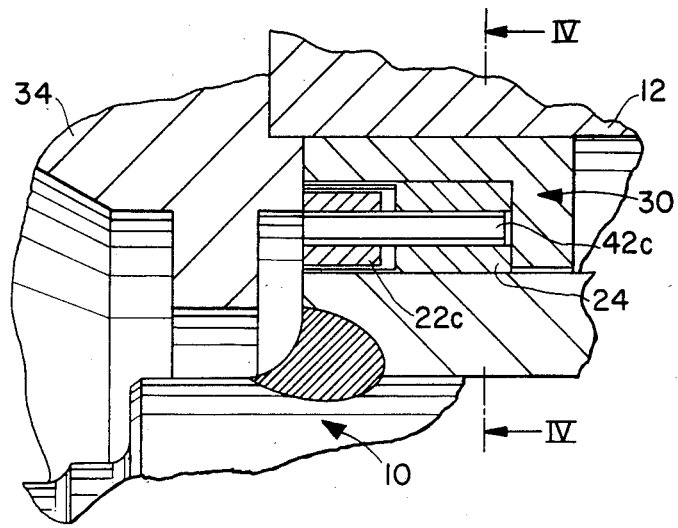
FIG. 3 is a view on the same lines as FIG. 2 of a further possible form of the novel arrangement of the rolling bodies.
Figure 4:
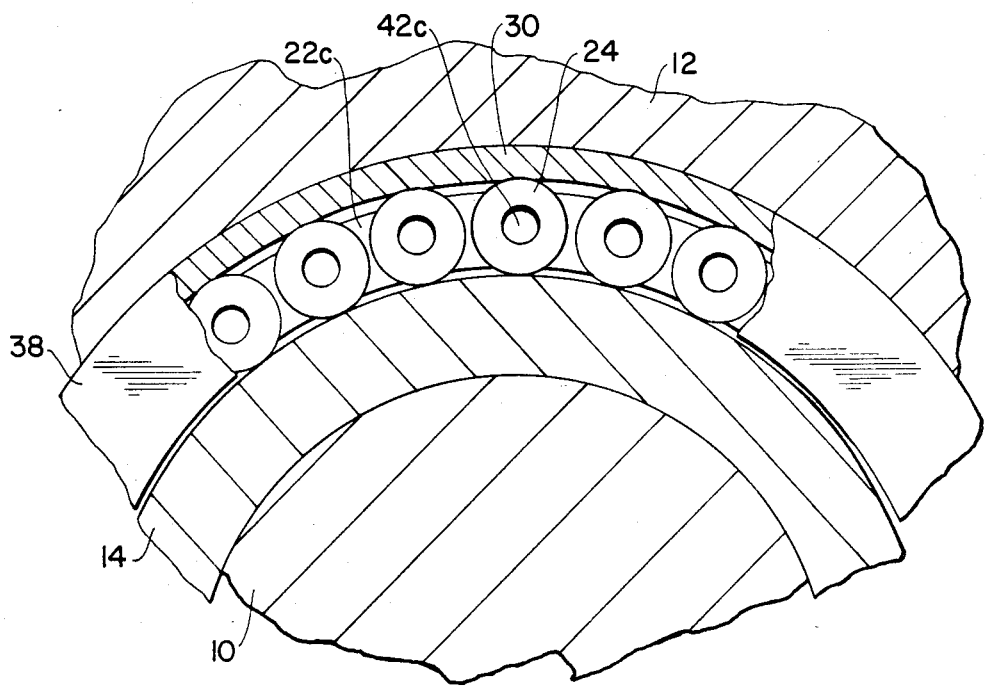
FIG. 4 is a section on the line IV—IV of FIG. 3.

In the case of the further form of the invention to be seen in FIGS. 3 and 4 it is possible to have even more cylindrical rollers 24. In this case the fingers 42c are in the form of bearing pins so that the cage 22c does not have parts placed between the rollers 24 but functions as bearing means for the rollers 24 and so keeps them spaced out so that the spacing of the fingers 42c or of the separate cylindrical rollers 24 in the circumferential direction only has to be a little larger at the operating temperature than the diameter of the rollers 24 and the same are able to be placed along the full circumference with a small distance between them.

I claim:

1. An anti-friction bearing unit, positioned in a housing and placed around a shaft, for a synthetic resin processing machine comprising; means defining an inner and outer bearing running face having a radial space between said faces, said means positioned between said housing and said shaft, rolling bodies placed in said radial space, said rolling bodies running on said inner and outer bearing running faces, a cage placed in said radial space, adjacent to said rolling bodies, for selective circumferential spacing of said rolling bodies around said shaft, means for substantially shutting off resin flow into said radial space, said means for shutting off resin flow positioned adjacent to said rolling bodies and facing toward said machine's inside chamber, a small gap positioned between said shut-off means and said shaft for providing resin flow into said radial space for lubricating said rolling bodies when said machine is at working temperature.

2. The anti-friction bearing unit as claimed in claim 1 wherein said rolling bodies are in the form of hollow bodies.

3. The anti-friction bearing unit as claimed in claim 1 wherein said rolling bodies are placed in groups of at least two bodies, such groups being kept spaced from each other by the cage.

4. The anti-friction bearing unit as claimed in claim 1 wherein said cage comprises circumferentially spaced bearing pins and said rolling bodies are hollow and placed on said pins and at the operating temperature the spacing between the bearing pins is only slightly greater than the diameter of the rolling bodies.

5. The anti-friction bearing unit as claimed in claim 1 comprising an outer bearing race ring with said outer running face formed thereon, said race ring having an extension thereon on one side of the bearing, said extension running towards said inner running face and being spaced therefrom at the operating temperature of said bearing by a small distance.

6. The anti-friction bearing unit as claimed in claim 1 wherein said cage comprises a solid ring placed on a side of said rolling bodies opposite to a side thereof nearer to the inside of the machine, said solid ring having fingers running out therefrom towards the inside of said machine between the rolling bodies.

7. The anti-friction bearing unit as claimed in claim 6 wherein said rolling bodies are adapted by fit against outer faces of adjacent rolling bodies.

8. The anti-friction bearing unit as claimed in claim 7 wherein said rolling bodies are placed in groups of at least two and said fingers are placed between said groups.

9. The anti-friction bearing unit as claimed in claim 6 wherein the fingers are in the form of bearing pins for said rolling bodies and placed within same.

* * * * *

UNITED STATES PATENT AND TRADEMARK OFFICE
CERTIFICATE OF CORRECTION

PATENT NO. : 4,577,980

DATED : March 25, 1986

INVENTOR(S) : Erich Weichenrieder

It is certified that error appears in the above-identified patent and that said Letters Patent is hereby corrected as shown below:

Column 1, line 23; "plan" should be --plain--

Column 3, line 8; insert "24" after --rollers--

Signed and Sealed this

Sixth Day of January, 1987

*Attest:*

DONALD J. QUIGG

*Attesting Officer*  *Commissioner of Patents and Trademarks*